US010949062B2

(12) United States Patent
Furihata et al.

(10) Patent No.: US 10,949,062 B2
(45) Date of Patent: Mar. 16, 2021

(54) DEVICE MAINTENANCE APPARATUS, DEVICE MAINTENANCE METHOD, DEVICE MAINTENANCE PROGRAM, AND RECORDING MEDIUM

(71) Applicant: Yokogawa Electric Corporation, Tokyo (JP)

(72) Inventors: Ryouhei Furihata, Tokyo (JP); Ayako Kono, Tokyo (JP); Yuya Iketsuki, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 15/600,845

(22) Filed: May 22, 2017

(65) Prior Publication Data

US 2017/0344201 A1 Nov. 30, 2017

(30) Foreign Application Priority Data

May 25, 2016 (JP) .............................. JP2016-104642

(51) Int. Cl.
| | |
|---|---|
| *G06F 3/0482* | (2013.01) |
| *G05B 23/02* | (2006.01) |
| *F01K 13/00* | (2006.01) |
| *G06F 3/0484* | (2013.01) |
| *E21B 33/03* | (2006.01) |

(52) U.S. Cl.
CPC ....... *G06F 3/0482* (2013.01); *G05B 23/0216* (2013.01); *G06F 3/04847* (2013.01); *E21B 33/03* (2013.01); *F01K 13/003* (2013.01)

(58) Field of Classification Search
None
See application file for complete search history.

(56) References Cited

U.S. PATENT DOCUMENTS

| | | | | |
|---|---|---|---|---|
| 9,794,433 | B1* | 10/2017 | Kodimer ............ | H04N 1/00344 |
| 2002/0054169 | A1* | 5/2002 | Richardson ......... | H04L 41/0893 |
| | | | | 715/854 |
| 2007/0079250 | A1 | 4/2007 | Bump et al. | |
| 2008/0140822 | A1* | 6/2008 | Torii .................... | H04L 41/0213 |
| | | | | 709/223 |
| 2013/0215461 | A1* | 8/2013 | Yasukawa .......... | H04N 1/00408 |
| | | | | 358/1.15 |
| 2013/0268890 | A1* | 10/2013 | Jensen .................. | G06Q 10/20 |
| | | | | 715/825 |
| 2014/0059468 | A1* | 2/2014 | Allgair ................ | G06F 3/04842 |
| | | | | 715/771 |
| 2015/0160816 | A1 | 6/2015 | Furihata | |
| 2015/0319039 | A1* | 11/2015 | Generozova ........ | G06F 9/44505 |
| | | | | 709/220 |

(Continued)

FOREIGN PATENT DOCUMENTS

| | | |
|---|---|---|
| EP | 2 881 815 A2 | 6/2015 |
| JP | 8-272436 A | 10/1996 |

(Continued)

*Primary Examiner* — Christopher J Fibbi
(74) *Attorney, Agent, or Firm* — Sughrue Mion, PLLC

(57) ABSTRACT

A device maintenance apparatus includes: a comparison target selector configured to select comparison targets of a device information of a device as a maintenance target; and a display configured to display a comparative information generated based on changes in the device information.

5 Claims, 8 Drawing Sheets

(56) References Cited

U.S. PATENT DOCUMENTS

| | | | |
|---|---|---|---|
| 2016/0065766 A1* | 3/2016 | Miyamoto | H04N 1/00506 358/1.13 |
| 2016/0195873 A1 | 7/2016 | Takegawa | |
| 2016/0352592 A1 | 12/2016 | Sasaki et al. | |

FOREIGN PATENT DOCUMENTS

| | | |
|---|---|---|
| JP | 2003504712 A | 2/2003 |
| JP | 2007257444 A | 10/2007 |
| JP | 2013-222316 A | 10/2013 |
| JP | 201496099 A | 5/2014 |
| JP | 2015001930 A | 1/2015 |
| JP | 2015-109011 A | 6/2015 |
| JP | 2015-114827 A | 6/2015 |
| JP | 2015146562 A | 8/2015 |
| JP | 2016058022 A | 4/2016 |
| WO | 0102919 A1 | 1/2001 |
| WO | 02/052511 A2 | 7/2002 |
| WO | 2015025380 A1 | 2/2015 |

\* cited by examiner

FIG. 7A

DEVICE INFORMATION SELECTION SCREEN (AA)

- ☐ PV
- ☐ PV URV
- ☐ PV LRV
- ☐ PROTECT
  ⋮

FIG. 7B

DEVICE INFORMATION SELECTION SCREEN (AB)

- ☐ PV
- ☐ PV URV
- ☐ PV HRV
  ⋮

FIG. 8A

COMMUNICATION A DEVICE INFORMATION SELECTION SCREEN

- ☐ PV
- ☐ PV Units
- ☐ SV
- ☐ SV Units
- ☐ TV
- ☐ TV Units
- ☐ QV
- ☐ QV Units
- ☐ Alarm Select
- ☐ Transfer Function
- ☐ Range Units
- ☐ Upper Range
- ☐ Lower Range
  ⋮

FIG. 8B

COMMUNICATION B DEVICE INFORMATION SELECTION SCREEN

- ☐ PV
- ☐ PV Units
- ☐ Alarm Select
- ☐ Transfer Function
- ☐ Range Units
- ☐ Upper Range
- ☐ Lower Range
  ⋮

FIG. 11
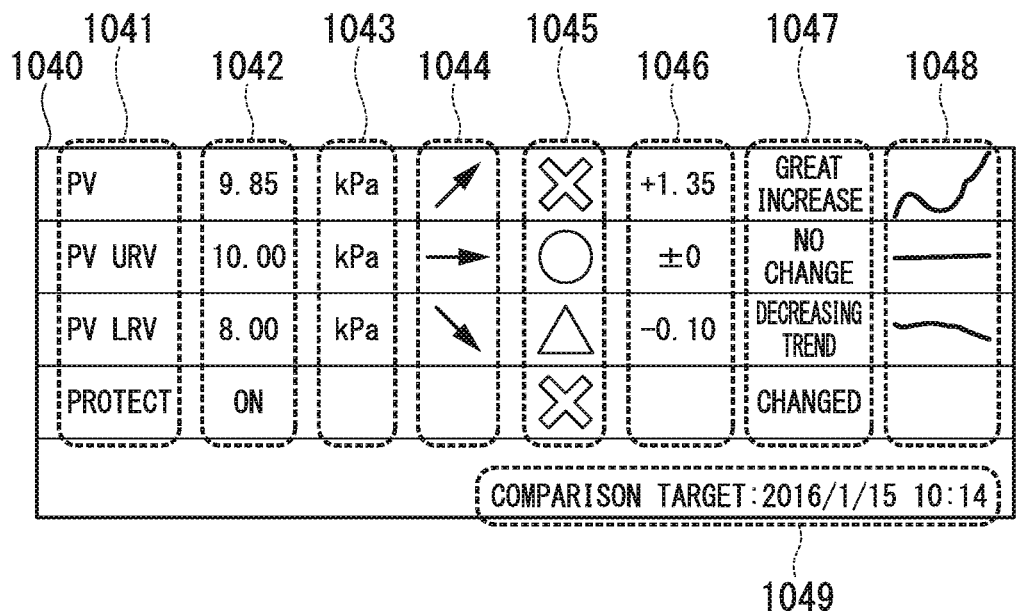
FIG. 12
RATE OF CHANGE FROM PREVIOUS: ±0%
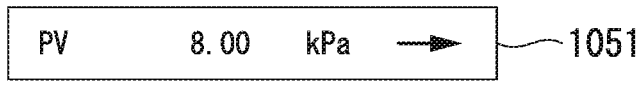
RATE OF CHANGE FROM PREVIOUS: +10 TO +50%
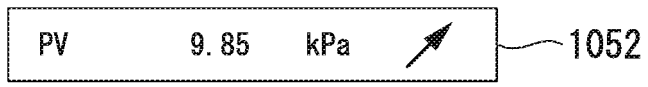
RATE OF CHANGE FROM PREVIOUS: 0 TO +10%
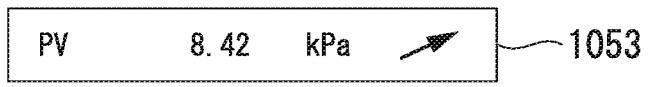
RATE OF CHANGE FROM PREVIOUS: 0 TO -10%
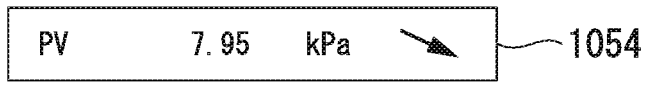

DEVICE MAINTENANCE APPARATUS, DEVICE MAINTENANCE METHOD, DEVICE MAINTENANCE PROGRAM, AND RECORDING MEDIUM

CROSS-REFERENCE TO RELATED APPLICATION

This application is based upon and claims the benefit of priority from Japanese Patent Application No. 2016-104642, filed May 25, 2016; the entire contents of which are incorporated herein by reference.

FIELD OF ART

The present invention relates to a device maintenance apparatus, a device maintenance method, a device maintenance program, and a recording medium.

BACKGROUND ART

In industrial plants such as chemical plants, plants that manage and control well heads such as in gas fields or petroleum fields, and the surrounding areas, plants that manage and control electrical generation such as hydroelectric, thermoelectric, and nuclear power generation, plants that manage and control environmental electric power such as from solar light or wind power, or a plant that manages and controls water and sewage or a dam, distributed control systems (DCSs) to which on-site devices such as measuring instruments or actuators known as field devices and control devices that controls them are connected via a communication means are built to implement a high degree of automated operation. In a plant in which such a distributed control system is implemented, from the standpoint of preventing erroneous operation and maintaining measurement accuracy, operators maintain field devices (hereinafter sometimes abbreviated "devices"), either periodically or irregularly.

The maintenance of field devices, for example, is performed using a device maintenance apparatus capable of communication with a field device, either wirelessly or by cable. The device maintenance apparatus, for example, is a computer such as a laptop or tablet computer, a PDA (personal digital assistant), or a smartphone into which a dedicated program for performing maintenance on the field device has been installed. The field device can hold one or a plurality of device information. Device information is information regarding the field device, being, for example, information for setting operation of the field device, information indicating the state of the field device, or identification information of the field device. The device maintenance apparatus reads and verifies the device information set in the field device, sets new device information into the field device, or changes the device information set in the field device.

There has been a device maintenance apparatus that displays on a display thereof the changed device information, when device information set into the field device has been changed, to verify the change of the device information, referring to, for example, Japanese Patent Application Publication No. 2015-109011.

Of plant monitoring apparatuses that display numerical information from processing of plant process data, there is one that displays on a display device the variation (trend) of numerical information from processing of process data over a prescribed period of time, referring to, for example, Japanese Patent Application Publication No. 2013-222316.

However, because the frequency of work (including non-regular) to verify, set, or change device information (hereinafter referred to as device information verification and the like) will differ, depending upon the usage condition of the field device, the type of field device, and the performance status of maintenance work, there has been a case, in which the period of time is not appropriate for understanding the variation in the device information, depending upon the device information. That is, for example, although the change of field device information that changes daily can be understood in a relatively short time period, the variation of the device information that changes with a frequency of once per month cannot be understood unless the time period is longer, so that the time period enabling an understanding of a change may vary. There has been a case in which just displaying changed information on a display of the device maintenance apparatus device makes it difficult to understand the details of the changed device information and to judge the influence of the change in the device information.

The present invention is made in consideration of the above-noted situation and has as an object to provide a device maintenance apparatus, a device maintenance method, a device maintenance program, and a recording medium, which display the change of device information in easily understandable form.

SUMMARY

In some aspects, a device maintenance apparatus may include, but is not limited to, a comparison target selector configured to select comparison targets of a device information of a device as a maintenance target; and a display configured to display a comparative information generated based on changes in the device information.

In some cases, the device maintenance apparatus may further include, but is not limited to, an information type selector that selects a type of device information for which the comparative information is to be made, and wherein the display displays the comparative information of the selected type.

In some cases, in the device maintenance apparatus, the information type selector may be configured to select the type for each of the device types.

In some cases, in the device maintenance apparatus, the information type selector may be configured to select the type for each of the communication types of the devices.

In some cases, the device maintenance apparatus may further include, but is not limited to, a display mode selector that selects a display format of the comparative information, and wherein the display displays the comparative information by the selected display format.

In some cases, in the device maintenance apparatus, the display mode selector may be configured to select at least one display format of an arrow, a preset symbol, the difference of the device information, and characters or graphs.

In some cases, in the device maintenance apparatus, the display mode selector may be configured to select the display format for each of the device types.

In some cases, in the device maintenance apparatus, the display mode selector may be configured to select the display format for each of the communication types of the devices.

In some aspects, a device maintenance method may include, but is not limited to, acquiring device information of a device under maintenance; selecting a comparison target of the device information; and displaying a comparative information generated based on the change of the device information.

In some aspects, a recording medium that stores a computer program, when executed by a computer, to cause the computer to: device information of a device under maintenance; select a comparison target of the device information; and display a comparative information generated based on the change of the device information.

According to the present invention a device maintenance apparatus, a device maintenance method, a device maintenance program, and a recording medium, which display the change of device information in easily understandable form, can be provided.

BRIEF DESCRIPTIONS OF THE DRAWINGS

FIG. 7A shows an example of a device information selection screen of a display displaying examples of device information in embodiments.

FIG. 7B shows another example of a device information selection screen of a display displaying examples of device information in embodiments.

FIG. 8A shows an example of a device information selection screen, when communication A is selected, of a display displaying examples of device information in embodiments.

FIG. 8B shows an example of a device information selection screen, when communication B is selected, of a display displaying examples of device information in embodiments.

FIG. 11 shows an example of a comparison region of the main screen displayed by the device maintenance apparatus in embodiments.

FIG. 12 shows another example of a display format of a comparison region of the main screen displayed by the device maintenance apparatus in embodiments.

DETAILED DESCRIPTIONS

Embodiments

A device maintenance apparatus, a device maintenance method, a device maintenance program, and a recording medium in an embodiment of the present invention will be described in detail below, with references made to the drawings.

Figure 1:
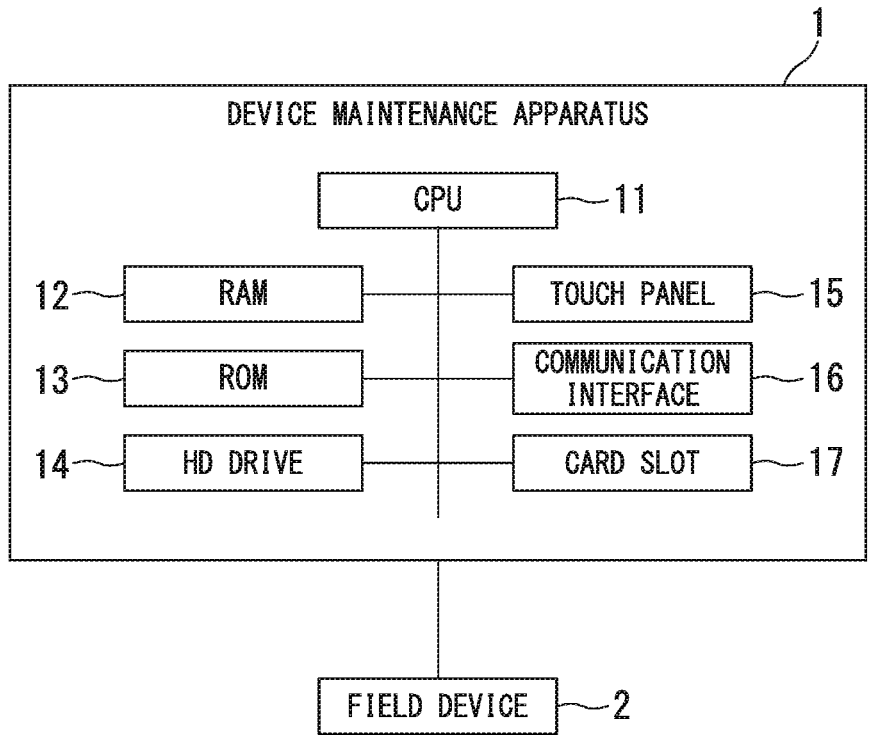
FIG. 1 is a block diagram showing an example of the hardware configuration of a device maintenance apparatus in an embodiment.

First, the hardware constitution of the device maintenance apparatus shown in FIG. 1 will be described. FIG. 1 is a block diagram showing an example of the hardware configuration of a device maintenance apparatus 1 in the embodiment.

In FIG. 1, the device maintenance apparatus 1 includes a CPU (central processing unit) 11, a RAM (random-access memory) 12, a ROM (read-only memory) 13, a HD (hard disk) drive 14, a touch panel 15, a communication interface 16, and a card slot 17. The device maintenance apparatus 1 is connected to a field device 2 to enable communication therewith.

The device maintenance apparatus 1 can be implemented by a general-purpose computing device such as a laptop PC, a tablet PC, a PDA, or a smartphone, or a dedicated device maintenance apparatus. The device maintenance apparatus 1 may be configured to support field device maintenance tasks by executing one or more device maintenance programs, including one or more device maintenance programs for maintaining one or more field devices. The device maintenance apparatus 1 is carried around within a plant by a worker performing maintenance tasks and is operated by the worker.

By executing a program stored in the RAM 12, the ROM 13, or HD drive 14, the CPU 11 controls the device maintenance apparatus 1. The device maintenance program, for example, is acquired from a recording medium in which the device maintenance program is recorded or from a server that provides the device maintenance program via a network, is installed on the HD drive 14, and read out and stored in the RAM 12 by the CPU 11.

The touch panel 15 has an operation/display function with an operation input function and a display function. The touch panel 15 displays information such as maintenance information regarding maintenance of a field device. The touch panel 15 enables a worker to make input of operations by using a fingertip, a touch pen, or the like. Although the device maintenance apparatus 1 in the present embodiment will be described for the case of using the touch panel 15 that has an operation/display function, the device maintenance apparatus 1 may have a display device that has a display function and an operation input device that has an operation input function, in which case, in the present embodiment, the display screen of the touch panel 15 can be implemented as a display screen of the display device, and operations of the touch panel 15 can be implemented as operations of the operation input device. The touch panel 15 may be implemented in a variety of forms, such as a head-mounted type, an eyeglass type, or a wristwatch type display.

The communication interface 16 is, for example, a network adapter that controls communications with a field device 2 or another device either via cable or wirelessly. Another device is, for example another device maintenance apparatus, a maintenance information management server, a DCS (distributed control system) controller, a factory automation computer, or a programmable logic controller (PLC), which are not illustrated.

The communication interface 16 controls communication with the field device 2 using a communication protocol that can be used in the field device 2. Various communication protocols are used in various field devices 2 used in a plant. The communication interface 16, therefore, controls communication with the field devices 2 by specific communication protocols handling the field devices 2. For example, the communication interface 16 controls communication with a field device 2 that uses the ISA (International Society of Automation) wireless communication standard ISA100 as the communication type. The communication interface 16 may control communication with a field device 2 using the industrial instrumentation dedicated communication types such as HART (Highway Addressable Remote Transducer) (registered trademark), BRAIN (registered trademark), FOUNDATION Fieldbus, or PROFIBUS. The communication interface 16 may control communication with a field device 2 or a distributed control system or the like that uses a general type of communication such as wireless LAN communication, cable LAN communication, infrared communication, or near-field wireless communication.

The card slot 17 is for insertion of a PC card. The card slot 17 enables the use of the functions of a PC card inserted into the device maintenance apparatus 1. A PC card can, for example, provide a communication function that implements specific communication or a storage function.

A field device 2 that is connected to the device maintenance apparatus 1 to enable communication therewith is, for example, an input device that inputs a signal of a physical quantity (pressure, temperature, or the like) to the device maintenance apparatus 1, such as a differential pressure gauge, a temperature gauge, or a flow gauge or an output device that outputs a control signal from the device maintenance apparatus 1 that changes the opening of an adjustment valve. Although FIG. 1 shows just one field device 2, as noted above various field devices 2 are used in a plant and the device maintenance apparatus 1 is connected to a plurality of field devices 2.

The above completes the description of the hardware configuration of the device maintenance apparatus 1 using FIG. 1.

The functional configuration of the device maintenance apparatus will now be described, using FIG. 2. FIG. 2 is a block diagram showing an example of the functional configuration of a device maintenance apparatus 100 of the embodiment. In the description to follow, references will be made to FIG. 1 as appropriate.

Figure 2A:
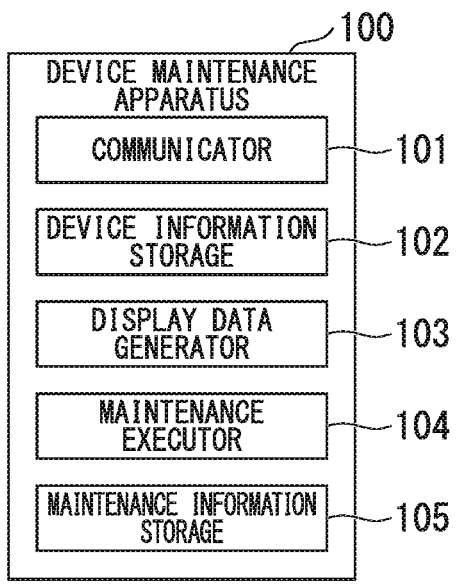
FIG. 2A is a block diagram showing an example of the functional configuration of a device maintenance apparatus of embodiments.

In FIG. 2A, the device maintenance apparatus 100 has the functions of a communicator 101, a device information storage 102, a display data generator 103, a maintenance executor 104, and a maintenance information storage 105. The above-noted functions of the device maintenance apparatus 100 can be implemented by the CPU 11 shown in FIG. 1 executing a program. That is, the above-noted functions of the device maintenance apparatus 100 are functional modules implemented by software.

The communicator 101 controls communication with the field device 2 or other devices, via the communication interface 16 and acquires parameters of the field device 2. A parameter of the field device 2 is an example of device information of the field device 2 and, in the present embodiment, the description will treat the device information and the parameter as having the same meaning.

The parameter of the field device 2, for example, is information that identifies the field device 2, such as the field device 2 device tag, device address, manufacturer, device ID or device type, model name, and communication standard, setting values for establishing the operation of the field device 2, information indicating the state of the field device 2, or values measured by the field device 2. That is, parameters may include both fixed values such as the device ID and variable values such as the field device setting values and measured values. The comparison of the parameters acquired from the field device 2, which will be described below, is the comparison in the case of which the parameters are variable values.

The communicator 101 performs parameter settings, readout, and verification of a field device 2, depending upon the type of communication (standard of communication) controlled by the communicator 101, such as ISA 100, HART, or BRAIN. The communicator 101 may control communication such as by wireless LAN, cable LAN, infrared, or near-field wireless communication. The communicator 101 may have program modules for performing control to handle communication of each type. The communicator 101 may be such that it enables additional installation of a program module required for each of the communication types. The communicator 101 can automatically (or manually) recognize a field device 2 connected thereto via the communication interface 16 and acquire the parameters of the recognized field device 2.

The acquisition of parameters of the field device 2 is not restricted to acquiring information by the above-noted communication. For example, a worker might visually verify the tag name or model name of a field device 2 and make key input, or might use a camera provided in the device maintenance apparatus 1 to photograph the name plate of a field device 2 that notes the tag name or model name and recognize the tag name or model name from the captured image to acquire these from the field device 2.

The timing of acquisition of parameters of the field device 2 is arbitrary. For example, the acquisition of parameters is done irregularly, by a worker performing maintenance items. The parameter acquisition might also be done periodically, at a period (frequency) pre-established in accordance with the type of field device 2, such as the type of the field device 2 or type of communication.

The device information storage 102 stores field device 2 device information (parameters) and corresponding maintenance item information. The maintenance items stored in the device information storage 102 are verification of the parameters set in the field devices 2, settings of parameters with respect to the field devices 2, prescribed tests, and prescribed adjustments and the like. The maintenance items may include output of a report for reporting the result of executing maintenance items. In the present embodiment, the maintenance items stored by the device information storage 102 are, for example, a loop test, a zero-point adjustment, a span adjustment, a quick report, display of detailed diagnosis information, tag/address/roll setting, setting/release of setting limits, DTM (device type manager) installation, DD (device description) installation, parameter acquisition, valve calibration, device squawk, ISA100 provisioning, device on-service/off-service switching, service mode switching, valve partial stroke test (partial actuation test).

The device information storage 102 associates each field device 2 with the maintenance items to be executed in the field devices 2 and stores the associated information to enable read-out thereof. The device information storage 102 can associate one or a plurality of maintenance items with one field device 2. Of the maintenance items, there are some maintenance items that can be executed by the prescribed field device 2 and some maintenance items that cannot. For example, a valve calibration maintenance item can be executed by a field device 2 that has a valve, but cannot be executed by a field device 2 such as a temperature gauge that does not have a valve. The device information storage 102 stores the maintenance items that can be executed by each of the field devices 2, in association with the field devices 2. The association of the field device 2 parameters and the maintenance items can, for example, be made based on a setting file into which the correspondence has been set beforehand. The setting file, for example, may associate information of the device type and communication type with the maintenance items. A worker may arbitrarily set the association of the field devices 2 with the maintenance items. A worker may set the association of the field devices 2 with the maintenance items when the maintenance items are executed.

In a field device 2, there may be a case in which maintenance items are not associated (that is, in which zero maintenance items are associated). For example, with respect to a field device 2 that has failed or a field device 2 that is not in use, by storing that no maintenance items are associated, it is possible to indicate that maintenance work is not required. The device information storage 102 may store the associated information in, for example, the HD drive 14.

The device information storage 102 stores parameters acquired from field devices in the past. The parameters of field devices 2 might differ, depending upon the type of field device 2. For example, the parameter contents will differ between the case in which the type of the field device 2 is an input device such as a pressure difference gauge and the case in which it is an output device such as a valve. The parameters of the field device 2 might also differ for each type of communication performed thereby. For example, the parameters of the field device 2 will differ between the case of using the ISA100 and the case of using HART as the communication type. That is, the device information storage 102 can store parameters having contents that differ for each field device 2 and are acquired at different times for each field device 2. In the present embodiment, a comparative information, in which parameters acquired from the field device 2 in the past and parameters acquired thereafter are compared to display, is displayed on the touch panel 15. The comparative information is generated based on the variations in the parameters being compared and is used allowing a worker to recognize variations in the parameters. In the comparative information, a worker is made to recognize the variations in parameters by graphics, characters, icons, symbols, parameter difference values, graphs, and the like. An example of a comparative information will be described later, using FIG. 9 and the like. The parameters in the comparison target can be selected from an information type selection screen, which will be described later. The device information storage 102, by storing parameters acquired in the past, enables selection of stored parameters from the information type selection screen.

Figure 2B:
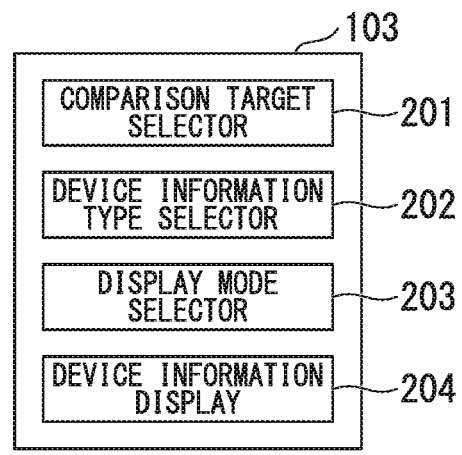
FIG. 2B is a block diagram showing an example of the functional constitution of a display data generator included in a device maintenance apparatus of FIG. 2A.

The display data generator 103 generates display data to be displayed on the touch panel 15. The display data generator 103 of the present embodiment has the functions shown in FIG. 2B. In FIG. 2B, the display data generator 103 has the functions of a comparison target selector 201, an information type selector 202, a display mode selector 203, and a device information display 204.

The comparison target selector 201 generates a comparison target selection screen for selecting the comparison target, displaying it on the touch panel 15 and enabling selection. In the description to follow, the generation of the selection screen and acquisition of the selection result will be referred to as selection. That is, the comparison target selector 201 selects the comparison target of the acquired device information. The comparison target is the target for comparison of the field device 2 parameters. Parameter comparison is performed by comparing a parameter acquired in the past with a parameter acquired thereafter. The method of the comparison target selector 201 selecting the comparison target is arbitrary. The number of comparison target parameters is an arbitrary number of two or greater. An example of the method of the comparison target selector 201 selecting the comparison target will be described later, using FIG. 5.

The information type selector 202 generates and displays on the touch panel 15 an information type selection screen for selecting the type of parameters to be displayed in a comparative information. That is, the information type selector 202 selects the type of device information to be displayed in a comparative information. The types of the parameters are acquired from each of the field devices 2, and there are several tens of parameter types, depending upon the field device 2. The information type selector 202 displays a comparative information on the touch panel 15, enabling selection from the parameters acquired from the field devices 2. Examples of parameter types will be described later, using FIG. 7 and FIG. 8.

The information type selector 202 displays so as to enable selection of the parameter types for each type (model) of field device 2. As described above, there are tens of parameter types, depending upon the field device 2, the parameter types are the same if the type of field device 2 is the same (including the case in which a part of the parameter types is the same). Therefore, by setting the parameter types to be displayed in the comparative information for each field device 2 type, it is possible to perform the same model settings all at once, thereby enabling facilitation of the setting task.

The information type selector 202 displays so as to enable selection of the parameter types for each communication type of the field devices 2. The parameter types are the same if the type of communication of the field devices 2 are the same (including the case in which a part of the parameter type is the same). Therefore, by setting the parameter types to be displayed in the comparative information for each field device 2 communication type, it is possible to perform the same communication type settings all at once, thereby enabling facilitation of the setting task.

The display mode selector 203 generates and displays on the touch panel 15 a display format selection screen for selecting the display format of the comparative information. That is, the display mode selector 203 selects the display format of the comparative information. The display format of the comparative information is, for example, the type of comparative information (type of display symbols), display color, display size, display position, and the sequence of display relative to another comparative information. The display format of the comparative information may include non-display of the comparative information. An example of the display format selection screen will be described later, using FIG. 9.

The device information display 204 generates and displays on the touch panel 15 the main screen. The main screen is displayed, for example, as the first display after the device maintenance apparatus 1 is started up. The main screen may be displayed when the device maintenance apparatus 1 is started up and then a log-in operation is made from a log-in screen (not shown) or when the initialization is made. The device information display 204 displays on the main screen the field device 2 parameters acquired by a communication connected by the communicator 101. The device information display 204 may display the acquired parameters of a plurality of field devices 2 for each device. The device information display 204 displays on the main screen a parameter comparative information selected by the information type selector 202 in the display format selected by the display mode selector 203. In the present embodiment, the case in which the device information display 204 displays the parameters acquired from the field devices 2 along with the comparative information will be described later, using FIG. 10 as well. However, the device information display 204 may be such that it displays the parameters of the field devices and the comparative information in different positions or in separate display screens.

In the present embodiment "displaying" in addition to being displaying of an image on the touch panel 15, refers to generating image data to be displayed on the touch panel 15. In the present embodiment, "the display" in addition to a display device (hardware device) such as the touch panel 15, may refer to having a function of generating display data to be displayed on a display device. That is, the display data generator 103 that generates display data displayed on the touch panel 15 is one form of the display.

The maintenance executor 104 is caused to execute maintenance items with respect to a field device 2 in accordance with the operation by the operator of pressing an execute button. Each maintenance item for which the operation is made is executed. The maintenance executor 104, for example, may make the setting regarding the maintenance items, and may display the progress of maintenance items or the results of executing maintenance items.

The maintenance information storage 105 stores the results of the maintenance items executed by the maintenance executor 104. The results of the maintenance items are, for example, the maintenance item execution date/time, the result of executing the maintenance items, a maintenance plan based on the result of executing the maintenance items. The maintenance item results stored by the maintenance information storage 105 may be read-out by the device information display 204 and compared in the comparative information.

In FIG. 2, the description is of the case in which the functions of the communicator 101, the device information storage 102, the display data generator 103, the maintenance executor 104, and the maintenance information storage 105 of the device maintenance apparatus 100 are implemented by software. However, one or more of the above-noted functions of the device maintenance apparatus 100 may be implemented by hardware. Of the above-noted functions of the device maintenance apparatus 100, one function may be divided into a plurality of functions, and two or more functions thereof may be combined into one function. Of the above-noted functions of the device maintenance apparatus 100, a plurality of functions may be merged into one function.

The above completes the description of the functional configuration of the device maintenance apparatus 100 using FIG. 2.

Figure 3:
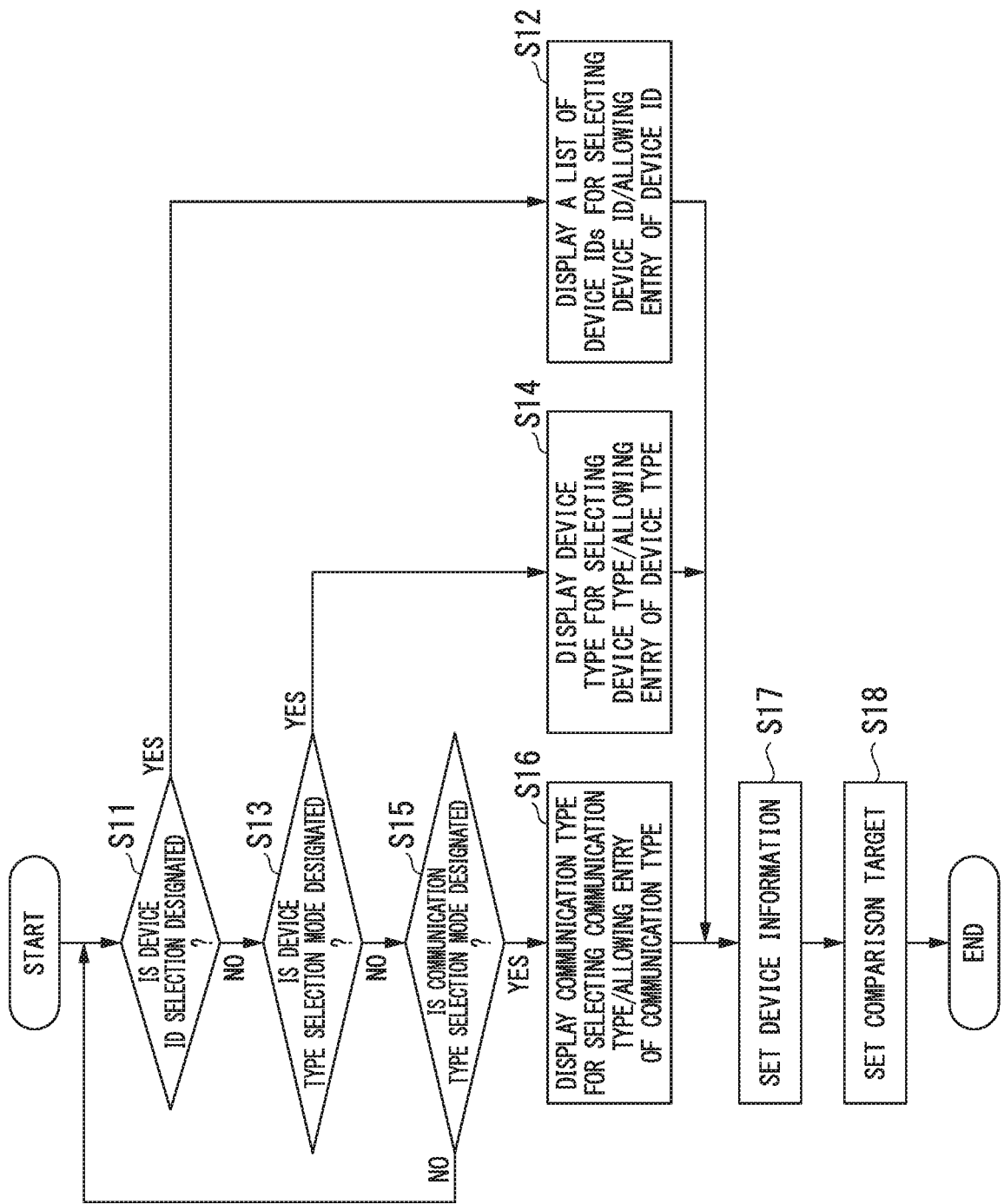
FIG. 3 is a flowchart showing an example of comparative information setting processing in a device maintenance apparatus in embodiments.

Next, using FIG. 3 and FIG. 4, the comparative information setting processing and comparative information processing will be described. FIG. 3 is a flowchart that shows an example of comparative information setting processing in a device maintenance apparatus 100 in an embodiment. The processing in the device maintenance apparatus 100 described in FIG. 3 and FIG. 4 can be, for example, executed by the CPU 11 of the device maintenance apparatus 100 executing the functions described in FIG. 2. In the following description, reference will be made to FIG. 1 and FIG. 2, as appropriate.

In FIG. 3, the device maintenance apparatus 100 determines whether or not the comparative information setting is to be made by device ID selection designation with respect to a field device 2 (step S11). Whether or not the comparative information setting is to be made separately with respect to a field device 2 can be determined, for example, by whether or not a specific tag ID or the like that specifies a field device 2 has been input at the information type selection screen, which will be described later. If the determination is that the comparative information setting is to be made separately (YES at step S11), the device maintenance apparatus 100 makes a setting so that the selection of the parameters (device information) to be displayed as the comparative information is a separate selection (step S12). By making separate parameter selection, for example, separate parameter selection is possible for a specific field device, such as a field device 2 requiring care in monitoring.

If, however, the determination is that separate comparative information setting is not to be done (NO at step S11), the device maintenance apparatus 100 determines whether or not to set the comparative information by the type of device of the field device 2 (step S13). Whether to the comparative information by the type of device of the field device 2 can be determined by, for example, whether or not the type of the field device 2 has been selected at the device type selection screen, which will be described later. If the determination is that the comparative information setting is to be made by the device type (YES at step S13), the device maintenance apparatus 100 makes a setting so that the selection of parameters display as the comparative information are selected by device type (step S14). By making parameter selection by device type, for example, it is possible to set a comparative information that encompasses parameters that are in common by the device type.

If, however, the determination is that the comparative information setting is not to be made by the device type (NO at step S13), the device maintenance apparatus 100 determines whether or not the comparative information setting is to be made by the communication type of the field device 2 (step S15). Whether or not the comparative information setting is to be made by the communication type of the field device 2 can be determined, for example, by whether or not the communication type of the field device 2 has been selected at the communication type selection screen, which will be described later. If the determination is that the comparative information setting is to be made by the communication type (YES at step S15), the device maintenance apparatus 100 makes a setting so that the parameters displayed as the comparative information are selected by the communication type (step S16). By making the parameter selection by the communication type, for example, it is possible to set a comparative information that encompasses parameters that are in common by the communication type.

If, however, the determination is that the comparative information setting is not to be made by the communication type (NO at step S15), the device maintenance apparatus 100 returns to the processing of step S11 and waits for any one of the selections to be selected by individual parameters, by the device type, and by the communication type in the processing of step S11 to step S15. When waiting for one of the selections to be made, if the setting of the comparative information is interrupted by, for example, closing any of the setting screens, the processing shown in the flowchart of FIG. 3 is ended.

After executing the processing of step S12, step S14, or step S16, the device maintenance apparatus 100 displays the selection screen for the parameters (device information) to be compared in the display so as to set the selection results (step S17). The parameter selection screen differs between when separate selection is set in the processing of step S12, when device type selection is set in the processing of step S14, and when communication type selection is set in the processing of step S16. The device maintenance apparatus 100 sets the parameters selected in each of the setting screens as the parameters for the comparative information and references these in the display processing of the comparative information described in FIG. 4. The selection screen for parameters if separate selection is set will be described later using FIG. 9. The selection screen for parameters if device type selection is set will be described later using FIG. 6A. The selection screen for parameters if communication type selection is set will be described later using FIG. 6B. The setting of the selected parameters is stored, for example, in the HD drive 14 of FIG. 1.

After executing the processing of step S17, the device maintenance apparatus 100 displays the comparison target selection screen for selecting the comparison target of the comparative information, sets the selection results (step S18), and ends the processing shown in the flowchart of FIG. 3. The comparison target selection screen will be described later, using FIG. 5. In FIG. 3, although the processing of step S17 to select the comparison target has been shown for the case of execution following the processing of step S11 to step S16, the comparison target selection processing may be performed separately from the processing of step S11 to step S16.

Figure 4:
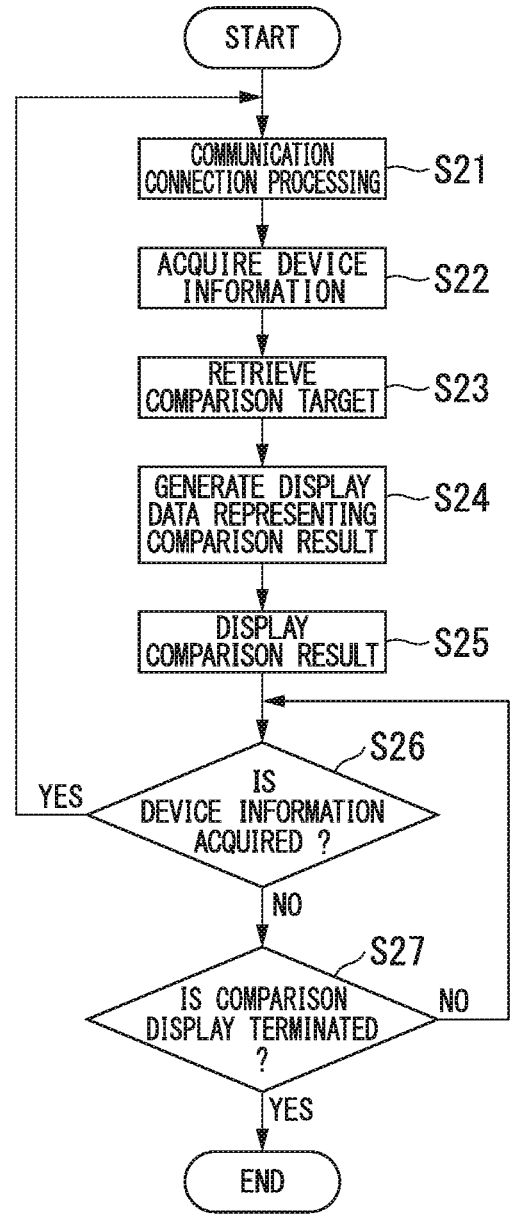
FIG. 4 is a flowchart showing an example of a comparative information processing in a device maintenance apparatus in embodiments.

FIG. 4 is a flowchart showing an example of the display processing for the comparative information in the device maintenance apparatus in the embodiment. The display processing for the comparative information shown in the flowchart of FIG. 4 is executed after execution of the comparative information setting processing shown in the flowchart of FIG. 3.

In FIG. 4, the device maintenance apparatus 100 performs communication connection processing with the field device 2 (step S21). The communication connection processing may be either cable connection or wireless connection. In the case of cable connection, for example, connection is made by a terminal of the device maintenance apparatus 100 being connected to a prescribed terminal of the field device 2. The communication connection processing is executed in accordance with a connection protocol of each communication type.

After executing the processing of step S21, the device maintenance apparatus 100 acquires parameters (device information) from the field device 2 (Step S22). The acquired parameters are, for example, stored in the HD drive 14. The method of acquiring the device information is arbitrary. The device maintenance apparatus 100, for example, may acquire the parameters, either automatically after the communication connection processing is done at step S21 or manually. The device maintenance apparatus 100 may also acquire the parameters automatically in a prescribed time interval, and may acquire the parameters automatically in accordance with a prescribed pre-established acquisition schedule.

After executing the processing of step S22, the device maintenance apparatus 100 executes comparison target retrieve processing (Step S23). Comparison target search processing is processing to search for a parameter to compare with the parameter acquired by the processing of step S22. The search targets (uses as a search condition) the parameters of the comparison target set by the processing of step S18, in the parameters set by the processing of step S17 of FIG. 3. The device maintenance apparatus 100 searches for the search target parameters from among the parameters acquired in the past from the field device 2, acquires those parameters, and makes them the comparison targets. The device maintenance apparatus 100, for example, searches for prescribed parameters acquired in a specific time period as the comparison targets.

After executing the processing of step S23, the device maintenance apparatus 100 generates the comparative information (step S24). The comparative information is generated in a pre-selected display format, based on the parameters acquired at step S22. After executing the processing of step S24, the device maintenance apparatus 100 displays the generated comparative information on the main screen (step S25). After executing the processing of step S25, the device maintenance apparatus 100 determines whether or not to re-acquire the parameters (step S26). Re-acquisition of the parameters can be arbitrarily executed, similar to the processing of step S22.

If the determination is that parameters are to be re-acquired (YES at step S26), the device maintenance apparatus 100 returns to the processing of substrate 21, and re-executes the processing of step S21 to step S25. For example, if the parameters are repeatedly acquired at a prescribed time interval, whether or not to re-acquire parameters can be determined by whether or not a prescribed amount of time has elapsed from the last parameter acquisition. By re-acquiring parameters the comparative information can be re-generated and displayed at each acquisition.

If, however, the determination is that parameters are not to be re-acquired (NO at step S26), the device maintenance apparatus 100 determines whether or not to end the processing (step S27). If the determination is to end the processing (YES at step S27), the device maintenance apparatus 100 ends the processing shown in the flowchart of FIG. 4. If, however, the determination is that the processing is not to be ended (NO at step S27), the device maintenance apparatus 100 repeats the processing of step S26 and waits for the end of the parameter re-acquisition or processing.

Although in the display processing of the comparative information shown in FIG. 4, the case shown is one in which the generation of the comparative information is executed every time parameters are acquired, the generation of the comparative information may be done, for example, when parameters have been acquired a prescribed number of times. The timing of the generation of the comparative information and the acquisition of parameters may be asynchronous.

The above completes the described of the comparative information setting processing and comparative information display processing using FIG. 3 and FIG. 4.

Figure 5:
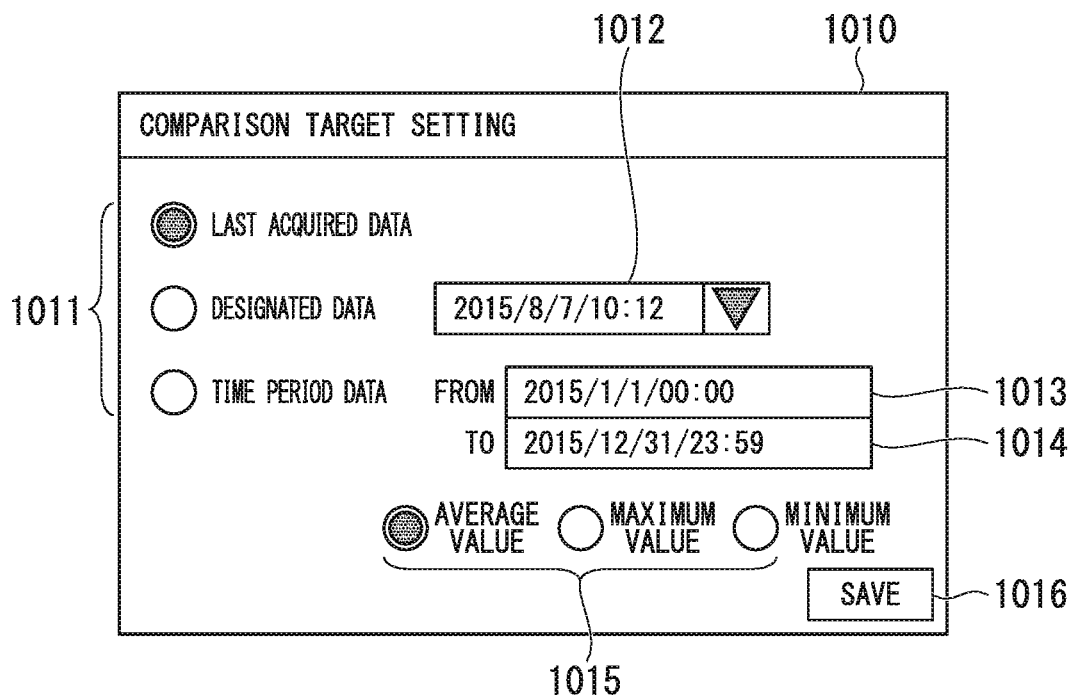
FIG. 5 shows an example of a setting screen for setting the comparison target of the comparative information displayed by a device maintenance apparatus in embodiments.

Next, the comparison target setting screen for the comparative information will be described, using FIG. 5. FIG. 5 shows an example of the comparison target setting screen for the comparative information displayed by the device maintenance apparatus in the embodiment. The comparison target setting screen shown in FIG. 5 is generated in the comparison target selector 201 of FIG. 2 and displayed on the touch panel 15.

In FIG. 5, the setting screen 1010 includes radio buttons 1011, a data specifier 1012, a starting date/time setter 1013, and ending date/time setter 1014, a numerical processing setter 1015, and a Save button 1016.

The radio buttons 1011 are for selecting any one of "Last Data Acquired", "Designated Data", and "Time Period Data" as the comparison target parameter data. Last Data Acquired makes the one data from the last time of acquisition the comparison target. Specified Data makes the one data acquired on the date and time specified in the data specifier 1012 the comparison target. The data specifier 1012 displays the date and time that the parameters were acquired so as to enable selection thereof. When parameters have been acquired at a plurality of dates and times, the data specifier 1012 enables the selection of one acquisition date/time by means of a pull-down menu. Time Period Data refers to the starting date/time and the ending date/time in the starting date/time setter 1013 and the ending date/time setter 1014. There is a case in which a plurality of parameters are acquired between the starting date/time and the ending date/time. The numerical processing setter 1015 specifies the numerical processing of parameters acquired between the starting date/time and the ending date/time. For example, average value calculation of acquired parameters is specified, and the average value is taken as the comparison target to be set. Maximum Value sets the maximum value of the acquired parameters, and Minimum Value specifies the minimum value of the acquired parameters as the comparison target.

The Save button 1016 is for saving the contents set by the radio buttons 1011 and the like. By pressing the Save button 1016, the comparative information reflects the set contents.

Although FIG. 5 shows the above method of selecting the comparison target, the method of selecting the comparison target is not restricted to that shown above. For example, as cases in which the target for selection is specified by a temporal condition such as a time or a time period, there is a case in which the parameter acquisition interval is greater than a prescribed time and the case in which the parameter acquisition is a prescribed day of the week or time of the day. Rather than specifying the target for selection by a temporal condition, a specification with a parameter value as the condition, a specification with the worker (for example, a worker ID) as the condition, or a specification with the operational condition of equipment or the production information as the condition, such as the quantity of product produced may be used for selecting the comparison target. For example, as a specification method by a parameter value as a condition, parameters of the acquired parameters that are determined to be normal (a normal value, normal range, or the like) may be stored beforehand and these may be used for selecting the comparison target. In contrast, of the acquired parameters, parameters determined to be abnormal (abnormal value, abnormal range, or the like) may be stored beforehand and these may be used as the target for selecting the comparison target.

The above completes the description of the comparison target setting screen for the comparison target using FIG. 5.

Next, the selection of device information type (parameter) to be displayed in the comparative information will be described, using FIG. 6, FIG. 7, and FIG. 8. FIG. 6 shows examples of the selection of the device information type to be displayed in the comparative information in the embodiment. The comparison target setting screens shown in FIG. 6 are generated by the information type selector 202 of FIG. 2 and displayed on the touch panel 15.

Figure 6A:
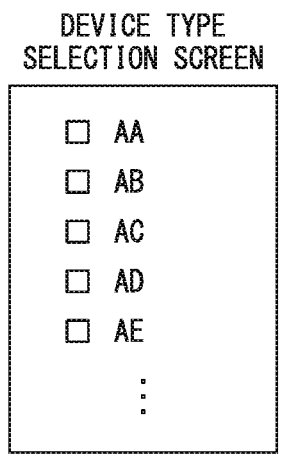
FIG. 6A shows an example of a device type selection screen of a display displaying types of device information in embodiments.

FIG. 6A is the selection screen for the case of selecting the parameters to be displayed in the comparative information by the type of field device. The selection screen of FIG. 6A includes checkboxes enabling selection of types such as AA and AB. The types such as AA and AB are, for example, the series names of the field devices 2. For example, type AA is a pressure difference gauge series, type AB is a temperature gauge series, and additionally type AC is a flow gauge series. If a plurality of device types are selected in the selection screen of FIG. 6A, the same parameters are applied to the plurality of selected device types. By enabling selection of a plurality of device types by means of checkboxes, the comparison target applied to a plurality of device types can be set simultaneously.

Figure 6B:
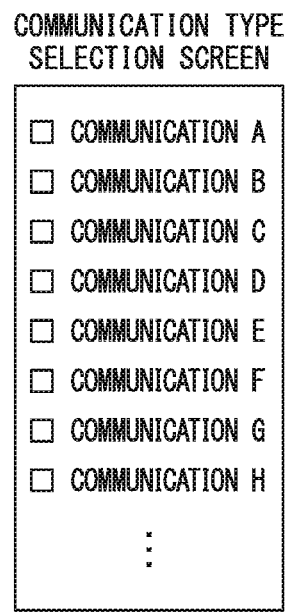
FIG. 6B shows an example of a communication type selection screen of a display displaying types of communications in embodiments.

FIG. 6B is a selection screen for the case of selecting the parameters to be display in the comparative information by the communication type of the field device. The section screen of FIG. 6B includes checkboxes enabling selection of communication types from Communication A to Communication H. Communication types such as Communication A and Communication B are, for example, the ISA100 and the HART communication protocol for the field devices 2. If a plurality of communication types are selected in the setting screen of FIG. 6B, similar to the selection screen of FIG. 6A, the same parameters are applied to the plurality of selected communication types. By enabling selection of a plurality of communication types by means of checkboxes, the comparison target applied to a plurality of communication types can be set simultaneously.

FIG. 7 shows field device selection screens for the case in which the device type of the field devices 2 is selected in FIG. 6A. FIG. 7A is the device information selection screen when the type AA is selected in FIG. 6A. FIG. 7B has checkboxes that enable selection of parameters such as PV (primary value), PV URV (upper range value), PV LRV (lower range value), and PROTECT (write protected). If a plurality of parameters are selected by the checkboxes, the plurality of parameters can be set at the same time as the comparison targets. In the present embodiment, in order to parameters selected for the comparative information on the main screen, the number of parameters that can be selected may be limited to a prescribed range. By selecting the device type and displaying a list of parameters acquired from that type of device, worker errors in setting parameters can be reduced.

FIG. 7B is the device information selection screen when the type AB is selected in FIG. 6A. FIG. 7B has checkboxes enabling selection of parameters such as PV, PV URV, and PV HRV (high range value). In FIG. 7B, some of the selected parameters are different from FIG. 7A.

FIG. 8 shows field device selection screens in the case of selecting the communication type of the field device 2 in FIG. 6B. FIG. 8A is the device information selection screen when the communication type Communication A is selected in FIG. 6B. FIG. 8A has checkboxes enabling selection of parameters such as PV and SV (secondary value). FIG. 8B is the device information selection screen when the communication type Communication B is selected in FIG. 6B.

Although the present embodiment shows the case in which the device type or communication type of the field device 2 is selected to display parameters uniquely, there is a case in which the parameters include ones that are almost never used in maintenance of equipment. Therefore, for example, in the parameter selection screen of FIG. 7 or FIG. 8, parameters that are often used can be displayed with priority. For example, the device maintenance apparatus 1 may count the number of times of acquisition or changing of a parameter for each device information to calculate the priority level and make a display based thereon.

Parameters that can be selected in accordance with another condition, such as a combination of the device type and communication type may be changed.

If a plurality of device types or communication types are selected in FIG. 6, parameters that can be selected in accordance with a plurality of device types or communication types may be changed.

The above completes the description of the selection of the type of parameters display in the comparative information using FIG. 6, FIG. 7, and FIG. 8.

Figure 9:
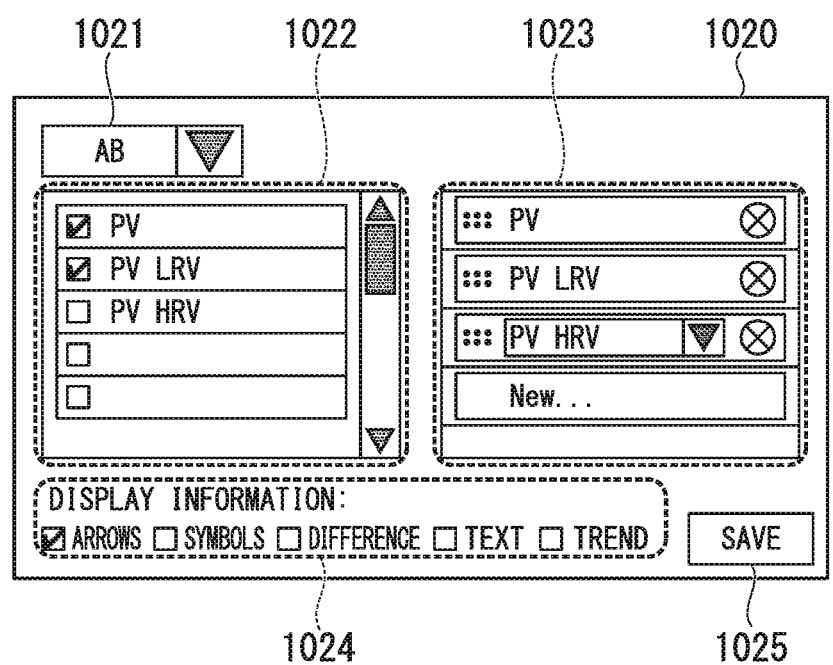
FIG. 9 shows an example of a screen, showing type selection, a parameter selection, a display target, a display information, and a save button, of a display included in the device maintenance apparatus in embodiments.

Next, the information type selection screen and the display format selection screen will be described, using FIG. 9. FIG. 9 shows an example of an information type selection screen and a display format selection screen displayed by the device maintenance apparatus in an embodiment. In FIG. 9, the information type selection screen 1029 has a type selector 1021, a parameter selector 1022, a display target 1023, a display information 1024, and a Save button 1025.

The type selector 1021 is a pull-down menu that selects the type of field device 2. The types of field device 2 selectable by the type selector 1021 are the above-described field device 2 device types and communication types. That is, the type selector 1021 has a function corresponding to the selection screens described by FIG. 6A and FIG. 6B.

The parameter selector 1022 displays selectable parameters in accordance with the field device type 2 selected by the type selector 1021, so that it has a function corresponding to the parameter selection screens described by FIG. 7A, FIG. 7B, FIG. 8A, and FIG. 8B.

The display target 1023 displays the target parameters selected by the parameter selector 1022. The display target 1023 displays a parameter selected by the checkboxes of the parameter selector 1022, a parameter dragged and dropped from the parameter selector 1022, or a parameter selected by the pull-down menu displayed in the display target 1023. The pull-down menu displays all the parameters displayed in the parameter selector 1022 or displays some of the parameters with priority. For example, parameters acquired in the past or parameters that are set for display in the pull-down menu may be displayed with priority. The parameters displayed in the display target 1023 may be rearranged, changed, or deleted. To the right side of each of the parameters selected by the display target 1023 is a cancel button with an X inside of a circle, as illustrated, for cancelling a selection. When a cancel button is pressed, the display of that parameter disappears and the selection thereof is cancelled.

The display information 1024 is an example of the display format selection screen, and are checkboxes selecting the display symbols, which are examples of the display format of the comparative information described by FIG. 2. The display information 1024 displays one or a plurality of arrows, symbols, differences, texts, and trend symbols, which can be selected. The display symbol setting selected in the display information 1024 may be applied to all parameters or applied to some parameters. The display symbol selected in the display information 1024 is displayed in the main screen. Details of the display symbols will be described later, using FIG. 11.

The Save button 1025 is for saving the contents set in the information type selection screen 1020.

The above completes the description of the information type selection screen 1020 using FIG. 9.

Figure 10:
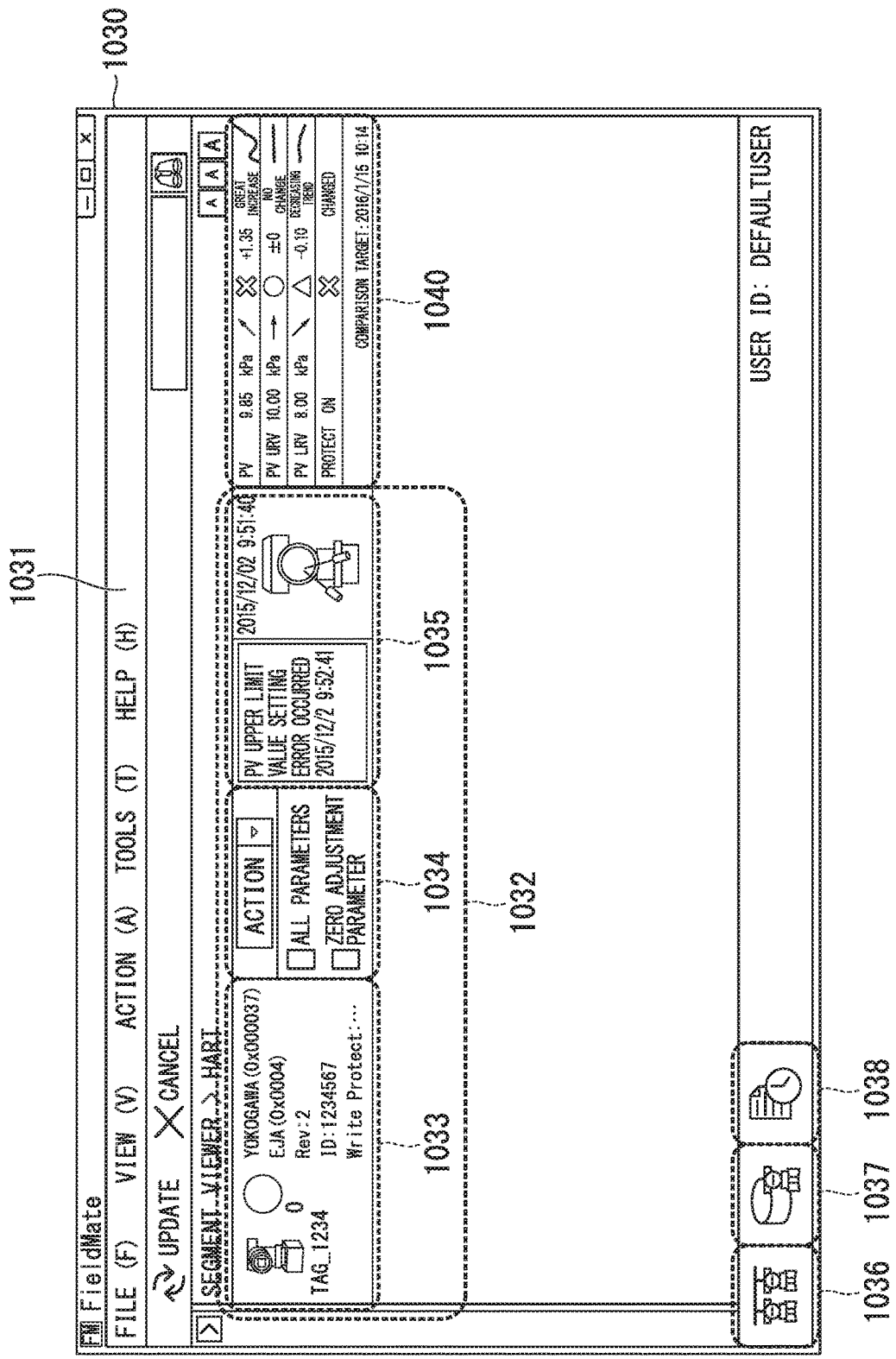
FIG. 10 shows an example of a main screen displayed by a device maintenance apparatus in embodiments.

Next, the main screen will be described, using FIG. 10 and FIG. 11. FIG. 10 shows an example of a main screen displayed by the device maintenance apparatus in the embodiment. FIG. 11 shows an example of the comparative information of the main screen displayed by the device maintenance apparatus in the embodiment.

In FIG. 10, the main screen 1030, as described above, is displayed first after the startup of the device maintenance apparatus 1. The main screen 1030 displays and registers parameters of the field devices 2. The main screen 1030 has a menu bar 1031, a basic device information display 1033, parameter acquisition buttons 1034, a note/image display 1035, and a parameter display 1040. In this case, the basic device information display 1033, the parameter acquisition buttons 1034, and the note/image display 1035 will hereinafter be referred to as the device information 1032. FIG. 10 shows an example of the display of the main screen in a field device 2 having the tag ID of TAG 1234. In the case of displaying a plurality of field devices, the device information 1032 and the parameter display 1040 are displayed multiply, the number thereof being the same as the number of field devices. If the device information 1032 displays for a plurality of devices, the parameter display 1040 is displayed to the right side of each device information 1032 as shown in FIG. 10. In the main screen 1030, the parameter displays 1040 are displayed along with the device information 1032 in correspondence to each of the device information 1032. The display format of the parameter display 1040 is not restricted to the case of display to the right side of the device information 1032 in the main screen 1030, such as shown in FIG. 10. For example, it may be displayed in a window separate from the main screen 1030. Details of the parameter display 1040 will be described later, using FIG. 11.

The menu bar 1031 has the major menu items File (F), View (V), Action (A), Tools (T), and Help (H). The characters in parentheses are shortcut keys that, when pressed together with a specified key, operate the menu bar. When a major menu item is selected, further selection is possible of a detailed menu item from a pull-down menu. In the present embodiment, a menu button at the time of operating a menu item Action (A) in the menu bar 1031 has the same function as the parameter acquisition button 1034 and the like.

The basic device information display 1033 displays the icon, device tag, manufacturer, device address, device ID, write protect status, and the like of a connected field device 2. The parameter acquisition buttons 1034 can display such buttons as an execute button for acquiring all parameters or zero-point adjustment parameters and a button for exporting the acquired parameters to an external file. The note/image display 1035 has comment field that displays a comment (note or sticky note) input beforehand with respect to the field device 2 under maintenance and a photograph display field that displays a photograph of the field device 2.

The main screen 1030 has a segment viewer switching button 1036, a device navigator switching button 1037, and an operation log switching button 1038. The main screen 1030 is displayed in the state in which the segment viewer switching button 1036 is pressed. The operation log switching button 1038 displays a display screen for displaying maintenance information such as execution information stored in the maintenance information storage 105.

In FIG. 11, the parameter display 1040 has parameter items 1041, parameter values 1042, unit indicators 1043, arrow displays 1044, symbol displays 1045, difference displays 1046, text displays 1047, trend displays 1048, and the comparison target 1049. The arrow displays 1044, the symbol displays 1045, the difference displays 1046, the text displays 1047, and the trend displays 1048 are an example of the comparative information. In the comparative information, the items selected in the display information 1024 described in FIG. 9 are displayed. FIG. 11 is an example of the display when all checkboxes have been selected in the display information 1024.

The arrow displays 1044 are display symbols that visualize the difference between comparison targets set in the setting screen 1010 of FIG. 5 and subsequently acquired parameters using the directions of arrows. The display format of the arrow directions will be described later, using FIG. 12. For a parameter such as PROTECT, which does not have a numerical value, the arrow direction 1044, the difference display 1046, and the trend display 1048 are not shown.

The symbol displays 1045 are display symbols that visualize the parameter difference with pre-established symbols. The symbol display 1045, for example, displays a circle if the parameter difference increase/decrease is normal, a triangle if the parameter difference increase/decrease requires attention, and an X if the parameter difference increase/decrease is abnormal. The reference (for example, comparison with a prescribed threshold) for judging normal or the like by the parameter difference increase/decrease can be set beforehand. By displaying the symbol display 1045 visual recognition of abnormalities and the like of parameters, which cannot be immediately be understood only by the increase and decrease of a parameter displayed by the arrow display 1044 or the trend display 1048 or the like, is facilitated.

The difference display 1046 has display symbols that represent the parameter differences as numerical values. The number of digits displayed in the difference displays 1046 can be set beforehand. The text display 1047 has display symbols that display information represented by text information established beforehand regarding the parameter change. For example, the parameter Protect indicates whether or not parameter write protection has been set and, if the setting has been changed, the character string "Changed" is displayed in the text display 1047. If there has been no change in setting, the text display 1047 displays the character string "No Change". The trend display 1048 has display symbols that visualize with a graph the variation of a parameter over a prescribed period of time. The comparison target 1049 displays the acquisition time and date of the comparison target parameter.

The display format of the parameter display 1040 is not restricted to the display example of FIG. 11. For example, the parameter items 1041, the parameter displays 1042, the unit indicators 1043, the arrow displays 1044, the symbol displays 1045 the difference display 1046, the text display 1047, and the trend display 1048 may have a display format that has a different display color, font, flashing or no flashing, or decoration such as frame lines, underlining or the like. The display format may change the sequence of displaying the parameters in the parameter display 1040 in accordance with a condition such as whether or not there is an abnormality. Also, the display format in the comparative information, for example, may include a still image or a video image or the like. The comparative information may be combined with a notification aspect other than a display, such as a sound or a vibration.

The above completes the description of the main screen 1030 using FIG. 10 and FIG. 11.

Next, using FIG. 12, the display format of the comparative information by arrow directions of the arrow display 1044 of FIG. 11 will be described. FIG. 12 shows an example of the display format of the comparative information by arrow directions, which is displayed by the device maintenance apparatus in the embodiment.

FIG. 12 is excerpted from the parameter items 1041, the parameter values 1042, the unit indicators 1043, and the arrow display 1044 of FIG. 11. FIG. 12, as examples of arrow directions, shows a horizontal display 1051, a sudden rise display 1052, a rise display 1053, and a decline display 1054. The horizontal display 1051 is the form of the display when the increase or decrease of a parameter compared to the previous time (for example, the comparison with the value to be the comparison target) is ±0%. The sudden rise display 1052 is the form of the display when the increase of a parameter compared to the previous time is +10 to +50%. The rise display 1053 is the form of the display when the increase of a parameter compared to the previous time is 0 to +10%. The decline display 1054 is the form of the display if the decrease of a parameter is 0 to −10%. By the form of the arrow display 1044, a worker can easily visually recognize the magnitude of the increase or decrease of a parameter. The display forms shown in the arrow display 1044 of FIG. 12 can be set and stored beforehand.

Although FIG. 12 describes the setting of the forms of the arrow display 1044 in the comparative information, the display forms can be set for other comparative information in the same manner.

The above completes the description of the display formats of the comparative information by arrow directions using FIG. 12.

As described above, the device maintenance apparatus of the present embodiment has a display that displays device information acquired from devices under maintenance, wherein the display displays a comparison target selection screen that selects the comparison target of the acquired device information and a device information display screen that displays a comparative information generated based on the variations in the device information of the selected comparison target for each device, thereby enabling an easy-to-understand display of the variation of device information.

Although the present embodiment has shown the example of the comparative information being displayed on the main screen 1030, this does not restrict the comparative information format. For example, the comparative information may be displayed in a separate window that is opened by touching information such as an icon or characters, or may be displayed by transitioning or switching to a separate window. If a plurality of display panels are provided, the main screen 1030 and comparative information may be displayed in separate display panels. Although the comparative information has been shown for the case in which it is displayed in a prescribed region, such as a rectangle, of the touch panel 15, rather than specifying a region on the touch panel, the comparative information may, for example, be operated by making a prescribed operation, such as a long pressing, swiping, or pinching of the touch panel. The comparative information may also be displayed and operated by a lamp or display provided in a hardware switch or the like.

The display color, display size, and font or the like of the comparative information may be changed with the passage of time. For example, the display color of the comparative information may change from blue to yellow or yellow to read and, along with the display of the comparative information, a notification means such as a sound or vibration may be used to give notification of parameter variations.

A program for implementing the functions of the devices described in the present embodiment may be recorded in a computer-readable recording medium, and a computer system may be made to read-in and execute the program stored in the recording medium, so as to implement the various above-noted processing of the present embodiment. The term "computer system" may include an operating system and hardware such as peripheral devices. The term "computer system" also includes a WWW system having a webpage-providing environment (or webpage-displaying environment). The term "computer-readable recording medium" refers to a writable non-volatile memory such as a flexible disk, an optomagnetic disk, a ROM, a flash memory, a removable media such as a CD-ROM, or the like, or a storage device such as a hard disk or the like built into a computer system.

Additionally, the term "computer-readable recording medium" encompasses one holding a program for a given period of time, such as a volatile memory (DRAM: dynamic random access memory) within a computer system serving as a server or client when a program is transmitted via a network such as the Internet or via a communication line such as a telephone line. The above-noted program may be transferred from a computer system in which the program is stored in a storage apparatus to another computer system, either via a transfer medium, or by a transfer wave in a transfer medium. In this case, the term "transfer medium" transferring a program refers to a medium having a function of transferring information, such as a network (communication network) such as the Internet, or a communication circuit (communication line) such as a telephone line. The above-noted program may be for implementing a part of the above-described functionality. Additionally, it may be a so-called difference file (difference program) enabling implementation in combination with a program that already has recorded the above-noted functionality in a computer system.

Although an embodiment of the present invention has been described, with references made to the drawings, the specific configuration is not restricted to that of the embodiment, and may be variously changed within the scope of the spirit of the present invention.

What is claimed is:

1. A device maintenance apparatus comprising:
at least one memory storing instructions, and
at least one processor configured to execute the instructions to:
display a communication type selection screen capable of receiving a selection of a communication type indicating a communication protocol which can be used in at least one field device;
display a device type selection screen capable of receiving a selection of a device type of the at least one field device, the device type being associated with the communication type selected in the communication type selection screen;
display a parameter selection screen capable of receiving a selection of at least one parameter to be displayed as comparative information, from among at least one parameter associated with the device type selected in the device type selection screen;
acquire a setting value of a target field device which is a maintenance target;
search for a last setting value of the parameter selected in the parameter selection screen from among setting values which were acquired from the target field device in the past and stored in a device information storage; and
display comparative information indicating change in the acquired setting value from the searched last setting value of the target field device,
wherein
the at least one processor is configured to execute the instructions to:
select at least one display format of the comparative information from an arrow, a preset symbol, difference of the setting value, characters, and graphs;
compare difference between the acquired setting value and the searched last setting value with a threshold; and
display, by the selected display format, the comparative information indicating an abnormality of the acquired setting value in a case where the difference between the acquired setting value and the searched last setting value exceeds the threshold.

2. The device maintenance apparatus according to claim 1,
wherein the at least one processor is configured to execute the instructions to:
in a case where a plurality of device types are selected in the device type selection screen, display the parameter selection screen capable of receiving a selection of at least one parameter which is common by the plurality of device types.

3. The device maintenance apparatus according to claim 1,
wherein the at least one processor is configured to execute the instructions to:
select the display format for each type of the field devices.

4. The device maintenance apparatus according to claim 1,
wherein the at least one processor is configured to execute the instructions to:
select the display format for each of communication types of the field devices.

5. A non-transitory computer-readable storage medium that stores a computer program, when executed by a computer, to cause the computer to:
display a communication type selection screen capable of receiving a selection of a communication type indicating a communication protocol which can be used in at least one field device;
display a device type selection screen capable of receiving a selection of a device type of the at least one field device, the device type being associated with the communication type selected in the communication type selection screen;
display a parameter selection screen capable of receiving a selection of at least one parameter to be displayed as comparative information, from among at least one parameter associated with the device type selected in the device type selection screen;
acquire a setting value of a target field device which is a maintenance target;
search for a last setting value of the parameter selected in the parameter selection screen from among setting values which were acquired from the target field device in the past and stored in a device information storage; and
display the comparative information indicating change in the acquired setting value from the searched last setting value of the target field device,
wherein
the computer program, when executed by the computer, to cause the computer to:

select at least one display format of the comparative information from an arrow, a preset symbol, difference of the setting value, characters, and graphs;

compare difference between the acquired setting value and the searched last setting value with a threshold; and display, by the selected display format, the comparative information indicating an abnormality of the acquired setting value in a case where the difference between the acquired setting value and the searched last setting value exceeds the threshold.

* * * * *